(12) United States Patent
Pine

(10) Patent No.: US 9,405,333 B1
(45) Date of Patent: Aug. 2, 2016

(54) METHOD AND SYSTEM FOR RUGGED TABLET PC BASED MODULAR DATA ACQUISITION

(71) Applicant: Jerrold Scott Pine, Boca Raton, FL (US)

(72) Inventor: Jerrold Scott Pine, Boca Raton, FL (US)

(73) Assignee: Allied Reliabily Group Inc., Charleston, SC (US)

( * ) Notice: Subject to any disclaimer, the term of this patent is extended or adjusted under 35 U.S.C. 154(b) by 21 days.

(21) Appl. No.: 14/665,431

(22) Filed: Mar. 23, 2015

(51) Int. Cl.
| | |
|---|---|
| *H05K 7/00* | (2006.01) |
| *H05K 5/00* | (2006.01) |
| *G06F 1/18* | (2006.01) |
| *G06F 1/16* | (2006.01) |
| *H05K 13/00* | (2006.01) |

(52) U.S. Cl.
CPC .............. *G06F 1/182* (2013.01); *G06F 1/1626* (2013.01); *G06F 1/1658* (2013.01); *G06F 1/1684* (2013.01); *H05K 13/0015* (2013.01)

(58) Field of Classification Search
CPC .............................. G06F 1/1616; G06F 1/1694
USPC ......................................... 361/679.21–679.34
See application file for complete search history.

(56) References Cited

U.S. PATENT DOCUMENTS

| | | | |
|---|---|---|---|
| 6,823,283 B2 | 11/2004 | Steger | |
| 7,542,867 B2 | 6/2009 | Steger | |
| 7,881,899 B2 | 2/2011 | Steger | |
| 2010/0246119 A1* | 9/2010 | Collopy | ................ G06F 1/1616 361/679.55 |
| 2011/0261269 A1* | 10/2011 | Khan | .................... G06F 1/1626 348/734 |

* cited by examiner

*Primary Examiner* — Jerry Wu

(57) ABSTRACT

A Method and system to produce a rugged modular data acquisition tablet computer comprised of a rugged tablet PC that uses a fluid ingress resistant interface plate to attach a data acquisition chassis that accepts attachably detachable expansion modules that provide data acquisition and customized computing functionality.

20 Claims, 18 Drawing Sheets

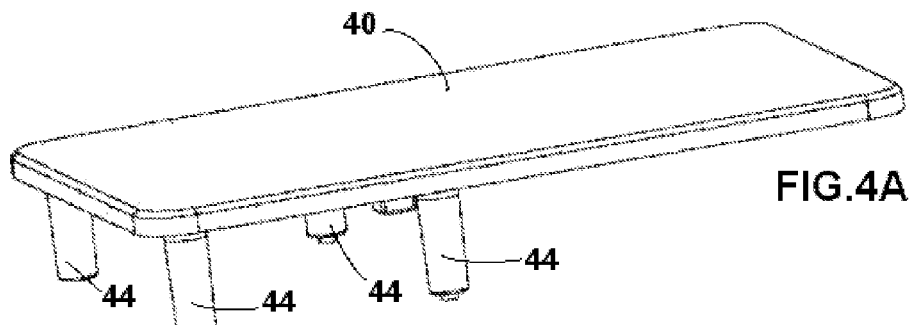
FIG. 4A
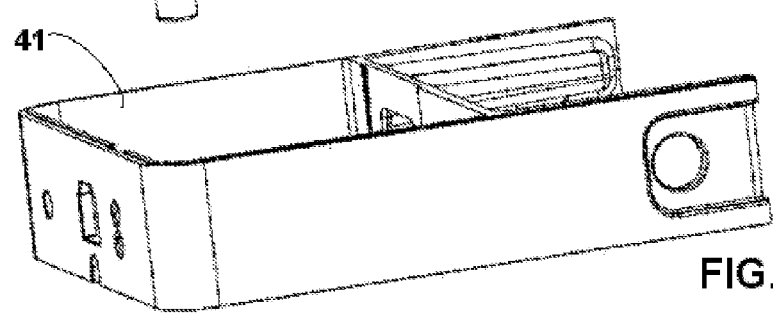
FIG. 4B
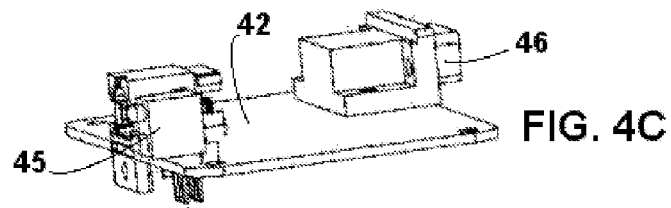
FIG. 4C
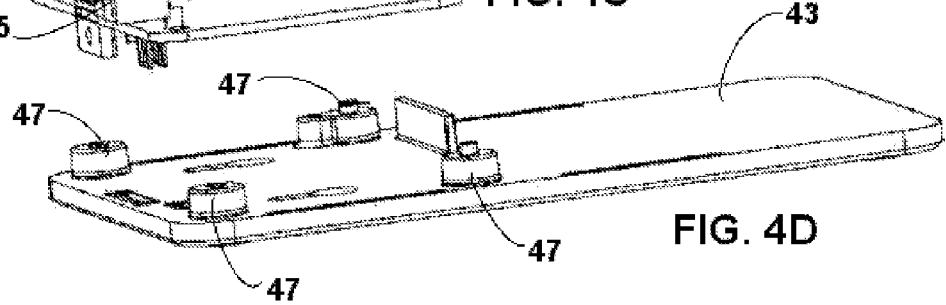
FIG. 4D
FIG. 4

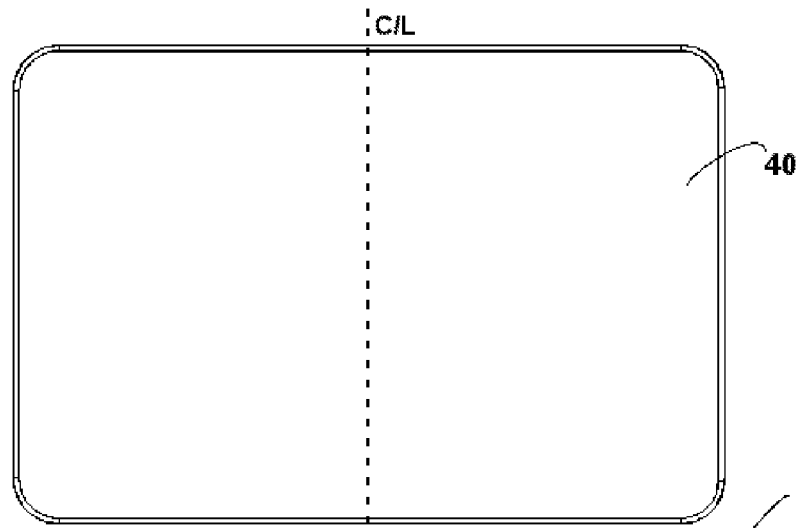
FIG. 8A
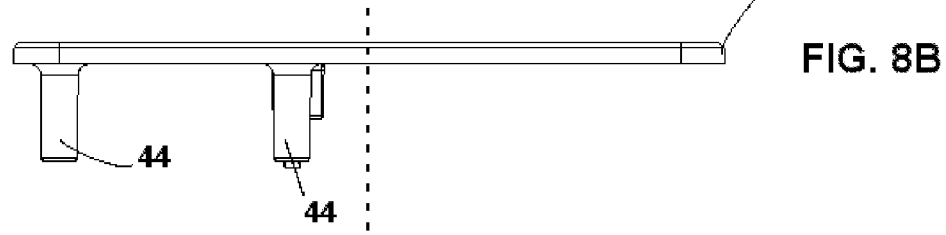
FIG. 8B
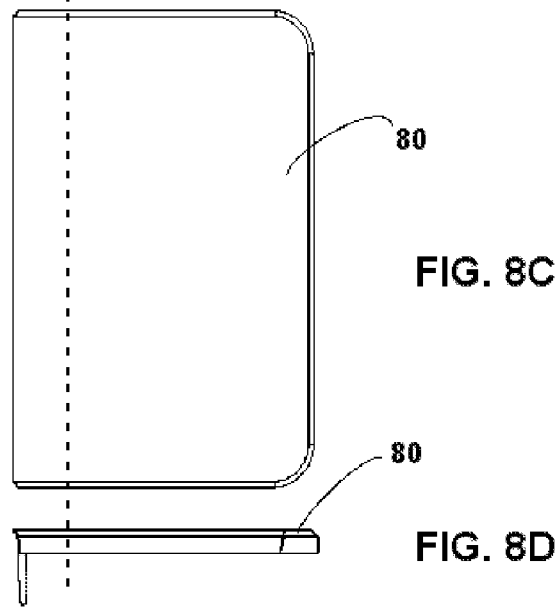
FIG. 8C
FIG. 8D

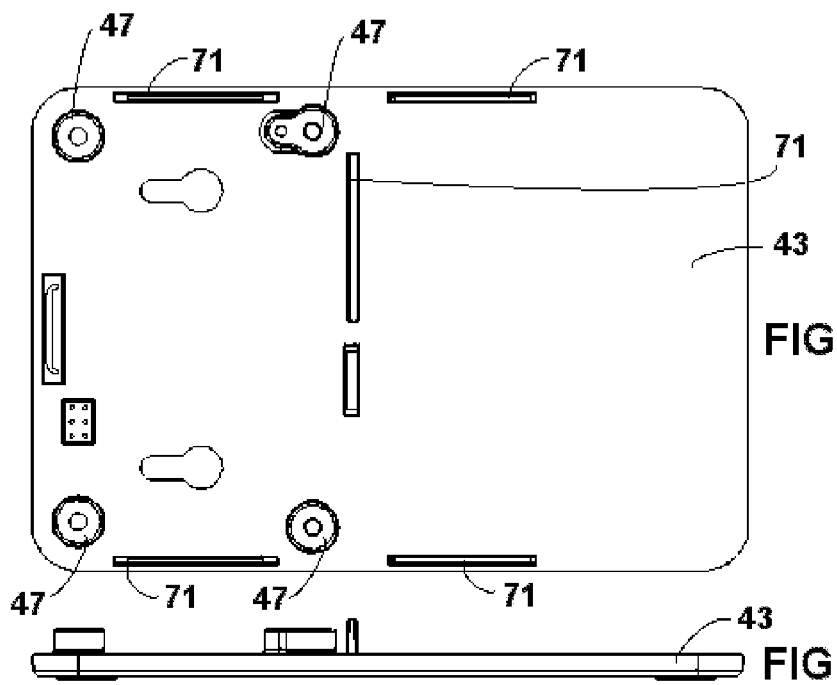
FIG. 11A
FIG. 11 B
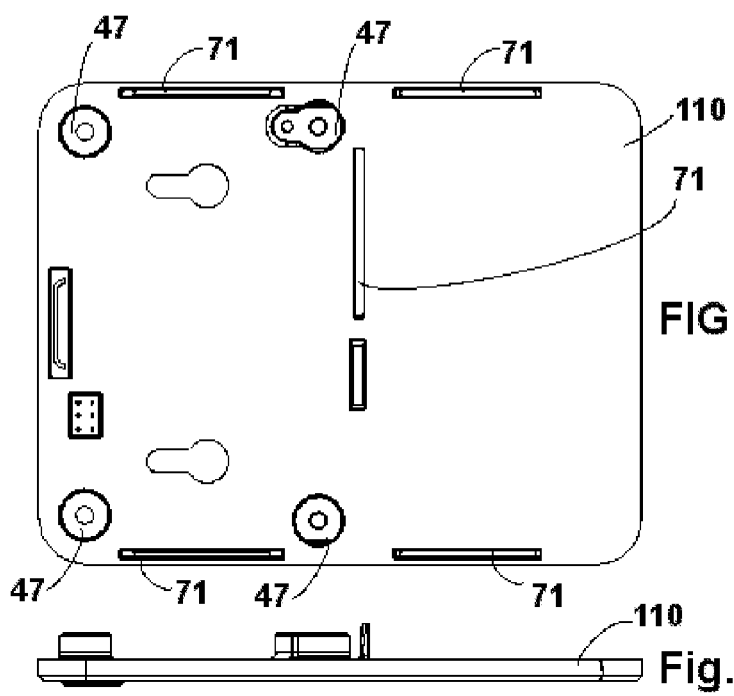
FIG. 11C
Fig. 11 D

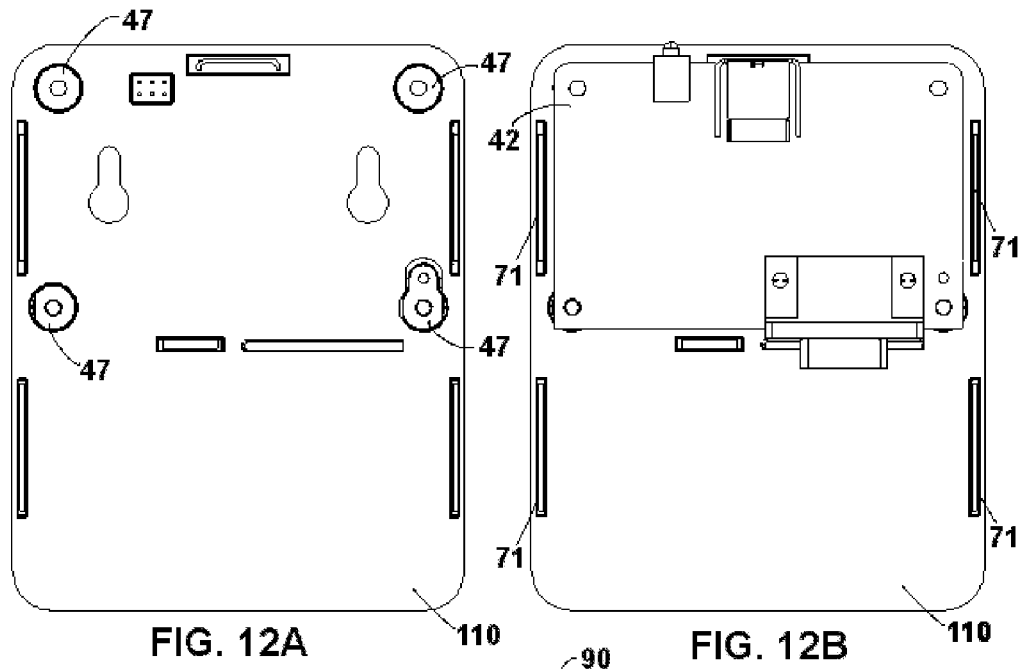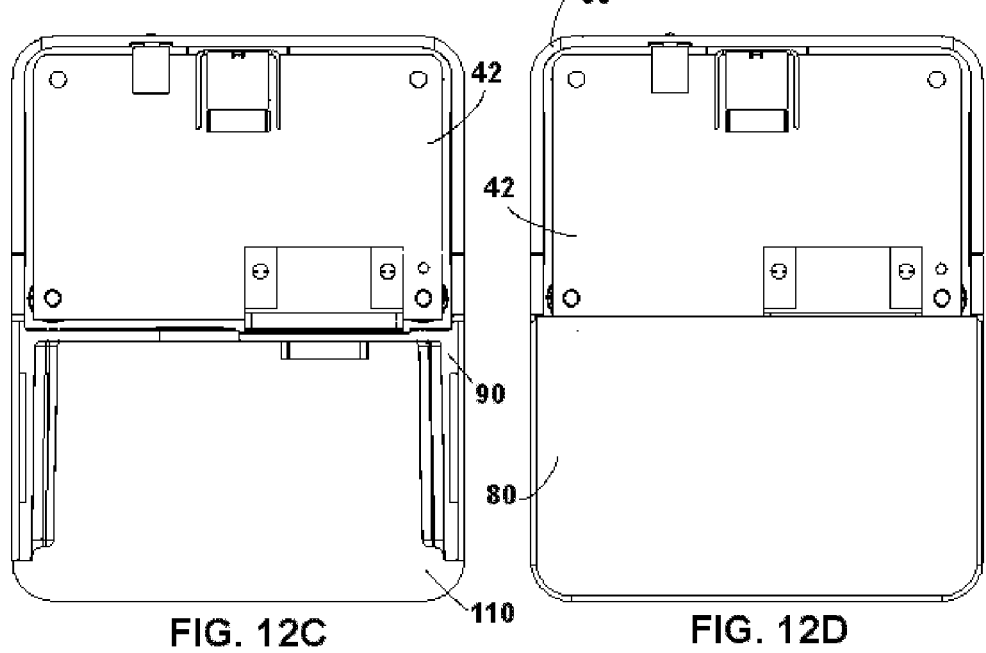

METHOD AND SYSTEM FOR RUGGED TABLET PC BASED MODULAR DATA ACQUISITION

FIELD OF THE INVENTION

The invention relates to a rugged tablet PC that uses a fluid ingress resistant interface plate to attach a data acquisition chassis that accepts attachably detachable expansion modules that provide data acquisition and customized computing functionality.

BACKGROUND OF THE INVENTION

As portable computing devices become increasingly smaller and lightweight, fewer customized hardware based computing solutions are incorporated directly into the device. This is especially true for tablet PCs that traditionally incorporate usb or serial I/O to expand the built-in capabilities of the device. The typical expansion solutions that exist for tablet PCs plug into one of these usb/serial expansion ports and may be coupled by cable to an electronic module that provides additional functionality to the tablet. While the usb/serial interface can provide practically all customized functionality, tablet I/O mechanical connections including proprietary, usb type A, and usb type B connectors have poor mechanical characteristics with little or no strain relief and may be easily dislodged during portable operation. When a customized tablet computing solution is achieved by adding the electronic module at the end of a cable, the elegance and efficiency of the tablet PCs mobility and form factor are compromised. Many expansion devices intended for mobile computing are coupled to the tablet PC using a cradle or sled approach to enhance the mobility, mechanical rigidity, and electrical connection to the tablet PC. These cradle and sled attachments tend to be bulky, and do not maintain the elegant weight and size profiles of the original tablet PC. Expansion bays to add functionality currently exist in some rugged tablet PCs and stylus PCs however they are generally internal pockets with limited access or are located on the back or edge of the PC behind cover plates. The rugged tablet PCs, available with expansion bays, are constructed with housings and components that can be exposed to environments where mechanical stresses to the unit and exposure to various wet and dusty conditions will not harm the PC. Portable Tablet based modular data acquisition systems are needed for this type of environment.

The human interface device on these mobile platforms has also evolved from traditional keyboards and mouse to stylus touchscreens, multi-touch gesture based touchscreens, voice recognition, and hand gesture analysis. Portable Tablet based modular data acquisition systems are needed using advanced human interface devices.

Today's mobile platforms are highly energy efficient. Some rugged tablet PCs have a second hot swappable battery so that the tablet PC can run in a mobile untethered mode indefinitely. When the tablet PC is used for data acquisition some sensors attached to it require very low power to operate. It would be ideal to use the tablet PC's power instead of requiring additional power sources. Portable Tablet based modular data acquisition systems that provide power to sensors through the data acquisition module and through the data acquisition carrier are needed.

Some of the hardware functionality desired on a tablet-based platform is the ability to make measurements including process monitoring, electrical measurements, mechanical measurements, chemical analysis and various measurements of physical phenomena. The tablet PC could process these measurements to perform complex data analysis, perform data logging and to control electrical and mechanical equipment. This functionally is all well known in the art collectively as data acquisition systems. There are many manufacturers of data acquisition systems and each may provide a fixed or modular system to make measurements. A modular system has the ability to select an electronic module suitable for the type of measurement desired and interchange it in a chassis when that measurement configuration is desired. One such company that makes modular data acquisition systems is National Instruments based out of Austin, Tex. National Instruments has several versions of modular data acquisition systems where the system has a sensor attached to a carrier attached to a computer. The commercialized version of the technology tends to be designed for desktop use where very complex combinations of measurements are possible. The mobile version of modular data acquisition as illustrated on National Instruments website, NI.com, has a data acquisition chassis tethered at the end of a cable to a laptop. With the popularity of tablet PCs, it would be nice to take this data acquisition technology and migrate it from a desktop platform to a fully mobile platform. To do this, the most compact form of a National Instruments data acquisition chassis can be adapted to attach to the tablet PC. Their most compact system is comprised of 50 different measurement modules capable of hundreds of different types of measurements that can be inserted into several different chassis comprising 1, 4, or 8 slots. These chassis then connect to a computer via usb, Ethernet, wifi or integrated controller forming a complete data acquisition system. The National Instruments system is called cDaq or CompactDaq and is protected by a dozen US patents. A majority of these patents detail specific elements of the system such as programmable elements, defining interfaces, configuring measurements, module design, and protocols between modules, carriers and computers. Just a few describe an overall system architecture however like all technological evolutions the reduction to practice often requires additional elements and novel methods to commercialize them.

What is needed is a single slot data acquisition chassis attached to a rugged tablet PC that accepts attachably detachable expansion modules to create a rugged tablet PC based modular data acquisition system.

SUMMARY OF THE PRESENT INVENTION

A first aspect of the present invention is to attach a data acquisition chassis to a rugged tablet PC and maintain a rugged computing device.

Yet, another aspect of the present invention is to attach a data acquisition chassis to a rugged tablet PC using an interface plate to make the junction between the data acquisition chassis and the rugged tablet PC fluid ingress resistant.

Yet, another aspect of the present invention comprises a method to create modified geometry housing components for a data acquisition chassis to attach it to a rugged tablet PC.

Yet, another aspect of the present invention comprises a method to disassemble, modify, and assemble a rugged tablet PC based modular data acquisition system.

Yet, another aspect of the present invention provides power from the rugged tablet PC to a data acquisition sensor through the data acquisition chassis and through the data acquisition module.

Yet, another aspect of the present invention provides a 10 point projected capacitive multi-touch human interface device to program data collection and to interact with a data collection GUI (Graphical User Interface).

Yet, another aspect of the present invention provides a lightweight implementation of a rugged tablet PC based modular data acquisition system.

Yet, another aspect of the present invention provides a means to add additional hardware functionality to a rugged tablet PC based modular data acquisition system.

BRIEF DESCRIPTION OF THE DRAWINGS

For the purpose of illustrating the invention, the specification presents drawings and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings:

FIGS. 4A, 4B, 4C, and 4D are perspective views forming an exploded diagram of a data acquisition chassis;

FIG. 8A illustrates a top view and FIG. 8B illustrates a side view of the top housing of the data acquisition chassis of FIG. 7 whereas FIG. 8C illustrates a top view and FIG. 8D illustrates a side view of the top housing of the data acquisition chassis according to the present invention;

FIG. 9A illustrates a perspective view of the middle housing of the data acquisition chassis of FIG. 4, whereas

FIG. 10A illustrates a side view of the middle housing of the data acquisition chassis of FIG. 4, whereas

FIG. 11A illustrates a top view and FIG. 11B illustrates a side view of the bottom housing of the data acquisition chassis of FIG. 4 whereas FIG. 11C illustrates a top view and FIG. 11D illustrates a side view of the bottom housing of the data acquisition chassis according to the present invention;

FIGS. 12A, 12B, 12C, and 12D illustrate a top view of the assembly of the data acquisition chassis according to the present invention;

DETAILED DESCRIPTION OF THE DRAWING

Figure 1:
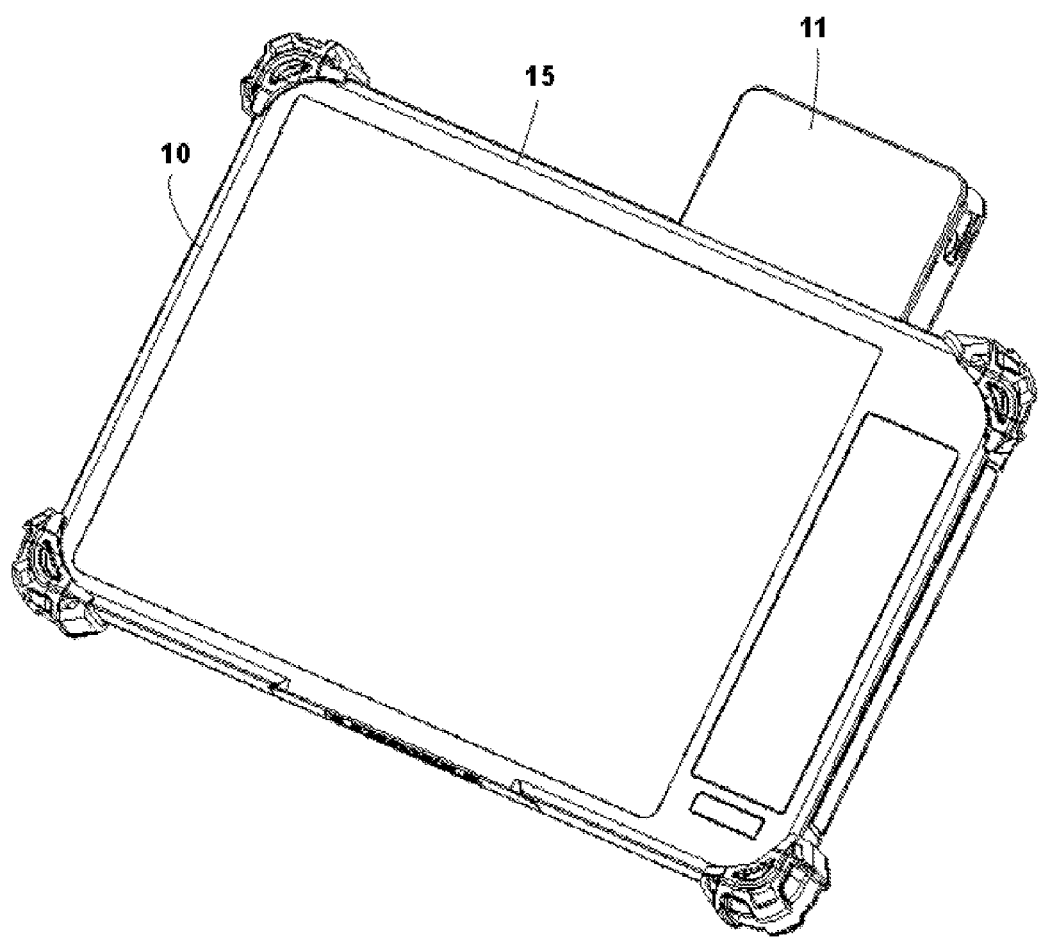
FIG. 1 illustrates a perspective view of a rugged tablet PC with attached chassis used for modular data acquisition.

FIG. 1 illustrates a perspective view of a rugged modular data acquisition tablet computer 15 according to a preferred embodiment of the invention. It is comprised of a data acquisition chassis 11 attached to a rugged tablet PC 10 using a fluid ingress resistant interface plate. It is constructed to be water, dust, and shock resistant. The rugged modular data acquisition tablet computer 15 is intended to be used with data acquisition modules coupled to at least one sensor to make measurements including process monitoring, electrical measurements, mechanical measurements, chemical analysis and various measurements of physical phenomena. The resulting measurements can be processed to perform complex data analysis, perform data logging and to control electrical and mechanical equipment.

Figure 2A:
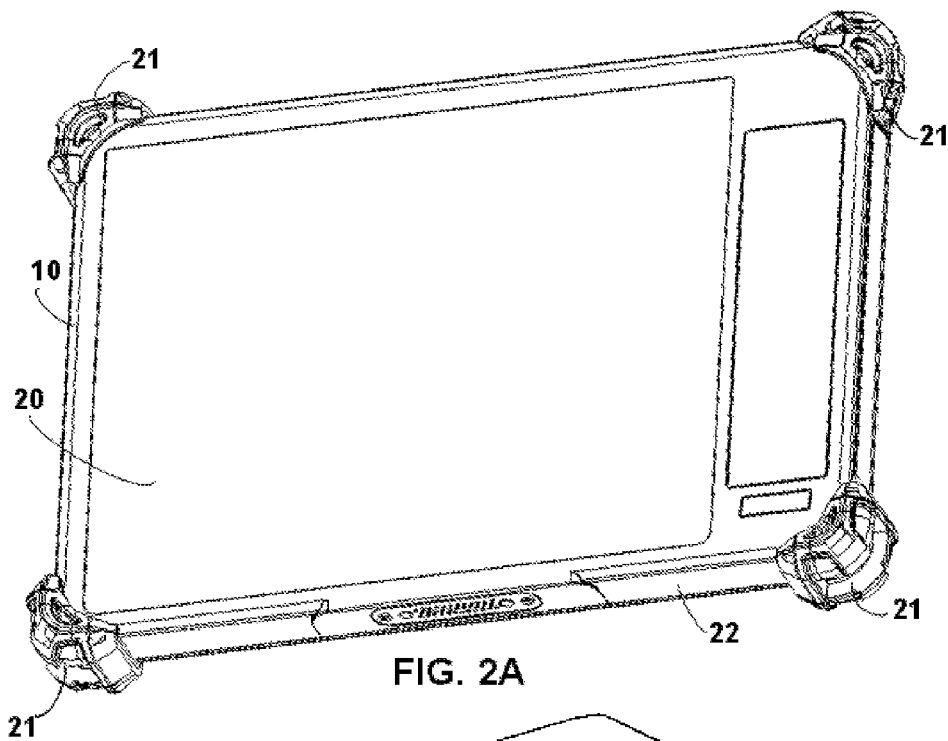
FIG. 2A illustrates a perspective view of a rugged tablet PC.
Figure 2B:
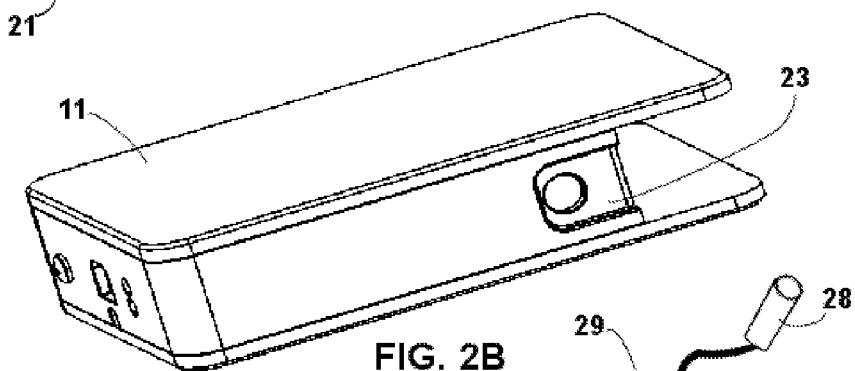
FIG. 2B is a perspective view of a data acquisition chassis.
Figure 2C:
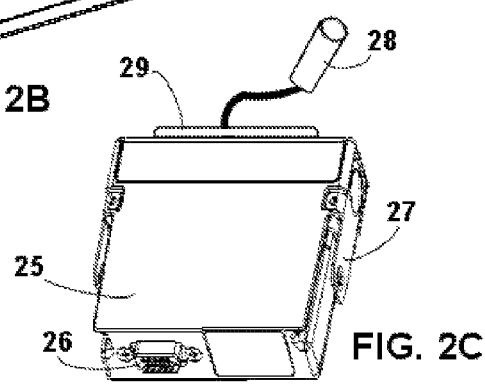
FIG. 2C is a representative data acquisition module that fits in the data acquisition chassis.

FIGS. 2A, 2B, and 2C show some native elements of the rugged modular data acquisition tablet computer 15. FIG. 2A is rugged tablet PC 10 which is comprised of a central processing unit (CPU), memory, power supply, system bus, data storage, peripheral interface ports, loudspeaker, touch screen display 20 and fluid ingress resistant housing 22. The example illustrated in FIG. 2A is of a rugged tablet PC 10 made by Arbor Technology Corp. The Arbor Technology rugged tablet PC 10 has a quad core Intel Celeron CPU, a dual battery hot swappable power supply, 8 GB DDR3L memory, FSB 1333 MHz system bus, 256 GB msata data storage, usb 3.0/2.0 ports, 2 W loudspeaker, 10.4 inch XGA TFT color LCD display with 10 point projected capacitive multi-touch interface and a gasketed 2 piece housing. It can be appreciated that this configuration is representative of rugged tablet PC 10 configurations which can produced using like components in various configurations well known in the art.

The internal construction of the rugged tablet PC 10 uses multiple fasteners to keep the components from getting damaged due to shock. In addition, there are corner bumpers 21 that absorb impacts to the rugged tablet PC 10. The illustrated rugged tablet PC 10 from Arbor Technology can withstand shock of 11 ms @ 20G per Mil-Std 810G and vibrations of 20 to 1000 Hz @ 1 grms per Mil-Std 810G. The rugged tablet PC 10 from Arbor Technology has an Ingress Protection rating of IP 54 that means that it is protected against dust limited ingress, and Protection against water sprayed from all directions—limited ingress permitted. This ingress protection is achieved by the using a two-piece gasketed housing comprising a top housing and a bottom housing with gasketed I/O port covers. The gasket is molded into the housing by a two-shot molding process. It can also be achieved by using a molded perimeter gasket or by use of a hardening or non-hardening form a gasket material. This fluid ingress resistant tablet computer can be used in humid and wet environments where traditional tablet PCs would ultimately succumb to fluid exposure. The rugged tablet PC 10 from Arbor Technology has a projected capacitive multi-touch interface comprising an electronic visual display where user input can achieved through simple or multi-touch gestures by touching the screen with a special stylus/pen and-or one or more fingers. Text can be written, typed, or swiped in. Gestures such as finger slide to scroll, 2 finger pinch or stretch to zoom, finger tap to select, or rotating two fingers to rotate items in a particular direction allow new degrees of user control. When used with a software graphical user interface for data acquisition it aids in ergonomic and quick data entry for a highly mobile platform. FIG. 2B is a data acquisition chassis 11. The purpose of the data acquisition chassis 11 is to house interface circuitry to configure and communicate data from at least one data acquisition module 25. Data acquisition module 25 can be interchanged with other Data acquisition modules 25 in the data acquisition chassis 11 as needed to make specific types of measurements. The data acquisition chassis 11 illustrated in FIG. 2B is a National Instruments cDAQ-9171 bus-powered, 1-slot CompactDAQ USB chassis. The data acquisition chassis 11 has an integral geometry to guide data acquisition module 25 in and out of the data acquisition chassis 11. The data acquisition chassis 11 also contains latching holes 23 that engage a spring clip 27 on data acquisition module 25 to retain the data acquisition module 25 within the data acquisition chassis 11. The I/O in this data acquisition chassis 11 is usb 2.0 based. It can be appreciated that the communication interface between the data acquisition chassis 11 and the rugged tablet PC 10 can be any serial or parallel interface or combinations thereof, can be wired or wireless via wifi networks or via cellular networks. FIG. 2C illustrates a data acquisition module 25. The data acquisition modules 25 are designed as self-contained modular measurement modules. All circuitry required for the specific measurement is contained in the module itself. Data acquisition modules 25 have an electrical connector 26 at the rear to plug into a data acquisition chassis, and an electrical connector 29 in front to attach to sensor(s) 28. Data acquisition modules 25 combine sensor measurements with voltage, current, and digital signals to create custom measurement systems. National Instruments makes 50 different CompactDaq data acquisition modules such as the data acquisition module 25 in FIG. 2C. Data acquisition modules 25 are available for a variety of sensor measurements including analog voltage, analog current, digital I/O, thermocouples, RTDs, strain gages, load and pressure transducers, torque cells, accelerometers, flow meters, encoders, and microphones. A sensor 28 is a device that responds to a physical stimulus as heat, light, sound, pressure, magnetism, or a particular motion and responds with a signal. The appropriate sensor(s) 28 would be electrically connected to convey signal information to the data acquisition chassis 11. Many CompactDaq data acquisition modules do not supply power to a sensor. An improvement to the data acquisition modules 25 would be to place an internal jumper from electrical connector 26 to electrical connector 29 to provide power from the rugged tablet PC 10 all the way through to a sensor. Since the form factor of the data acquisition module 25 and the electrical interface between the data acquisition module 25 and the data acquisition chassis 11 is well defined, new data acquisition modules can be created for new measurements or functionality.

Figure 3A:
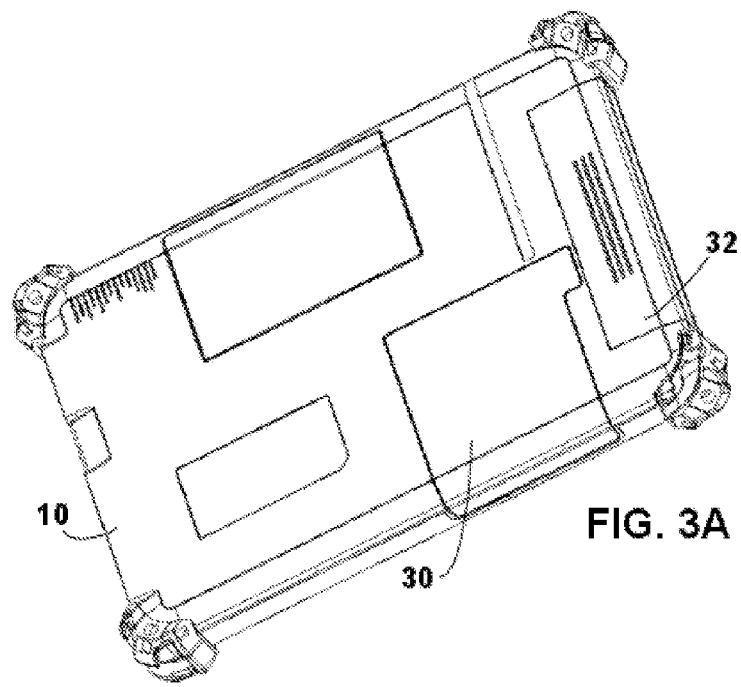
FIG. 3A and FIG. 3B illustrate perspective views of the back of the rugged tablet PC to indicate the location of an expansion bay.
Figure 3B:
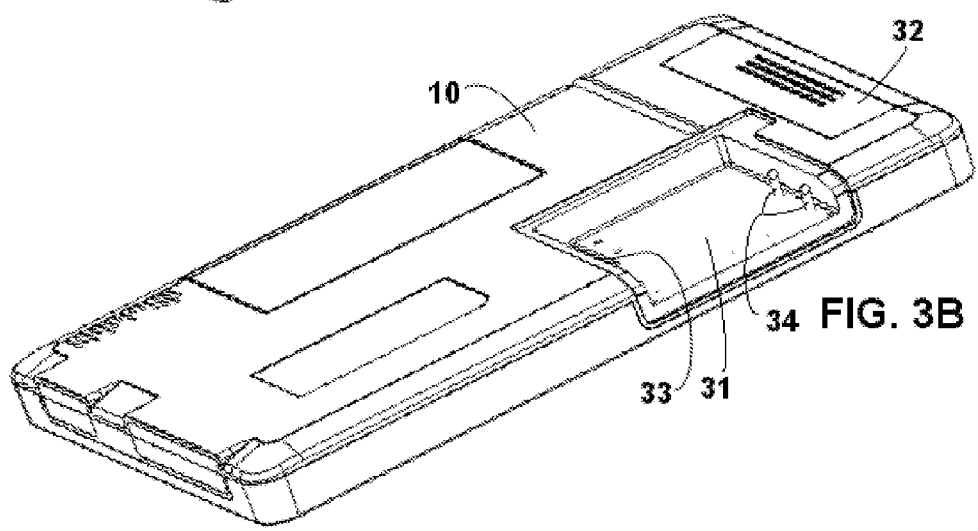

In FIG. 3A and FIG. 3B the back of rugged tablet PC 10 is illustrated. FIG. 3A shows the location of one external hot swappable battery 32 and the expansion bay cover 30 on the rugged tablet PC 10. FIG. 3B shows the same rugged tablet PC 10 wherein the expansion bay cover 30 is removed and the expansion bay 31 is revealed. The expansion bay 31 has an electrical interface connector 33 that is connected to the motherboard of the rugged tablet PC 10. The electrical signals available through electrical interface connector 33 include +5V, +3.3V, GND, expresscard 54 interface, and a usb port. This expansion bay 31 allows Arbor Technologies to offer accessories for the rugged tablet PC 10 such as a GPS, Magnetic Stripe Reader, and smartcard reader. The geometry of the expansion bay 31 is not wide enough or deep enough to accept a data acquisition chassis 11 and its associated components. Another issue is that molded in standoffs 34 are not positioned in a location suitable to attach to or adapt to a data acquisition chassis 11 and actually interfere with the rugged modular data acquisition tablet computer 15 assembly. In order to attach a data acquisition chassis 11 to the rugged tablet PC 10 the standoffs 34 will need to be removed to accommodate new standoffs that are detailed in FIG. 16.

FIGS. 4A, 4B, 4C, and 4D form an exploded diagram of the components that make up a data acquisition chassis 11. Three sections make up the data acquisition chassis housing that encapsulate interface printed circuit board assembly 42. FIG. 4A is the top section 40 of the data acquisition chassis housing. Top section 40 contains features to align it with a middle section 41 of data acquisition chassis housing and also contains integral threaded standoffs 44 to accept fasteners to hold the housing assembly together. FIG. 4B illustrates the middle section 41 of the data acquisition chassis housing. Middle section 41 further has features to align it with a bottom section 43 and these features on the top and bottom surfaces of the middle section 41 keep it captured and aligned with top section 40 and bottom section 43 when the data acquisition chassis housing is fastened together. FIG. 4C is an interface printed circuit board assembly 42 that serves as interface circuitry to configure and communicate data from a data acquisition module 25 to a rugged tablet PC 10 over usb. The interface printed circuit board assembly 42 comprises a usb connector 45 that protrudes through the Middle section 41 when assembled together. The interface printed circuit board assembly 42 further comprises an electrical connector 46 to connect with a data acquisition module 25. Electrical connector 46 is typically a DB15 connector that has 15 pins where pins GND, Power, Sleep, ID select, SPI_CLK, MOSI, MISO, SPI_CS, SPI_FUNC, Convert, Busy, Trig_out, and Oversample Clock define the serial interface between the data acquisition module 25 and the data acquisition chassis 11. FIG. 4D illustrates the bottom section 43 of the chassis housing. The bottom section 43 of the chassis housing contains four integral standoffs 47 to support the interface printed circuit board assembly 42. Holes in integral standoffs 47, align with holes in interface printed circuit board assembly 42, and holes in integral threaded standoffs 44 that accept fasteners to hold the entire assembly together.

Figure 5:
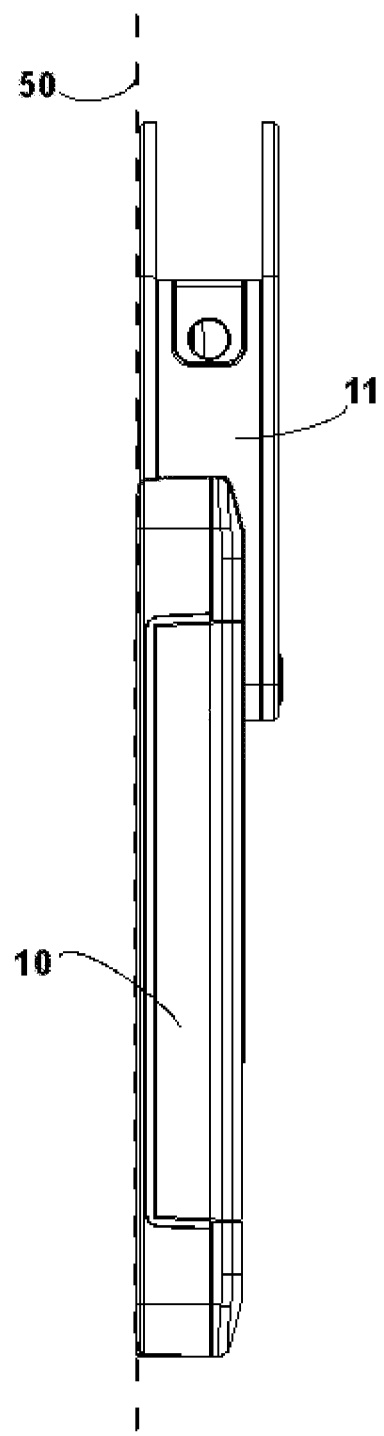
FIG. 5 illustrates a side view of the rugged tablet PC with a superimposed data acquisition chassis to establish a geometry for the chassis.

FIG. 5 illustrates the side view alignment of the data acquisition chassis 11 and the rugged tablet PC 10 according to the preferred embodiment of the invention. To create a combined assembly between these two independent assemblies a 3D CAD system is the preferred approach to merge and modify the components as needed. The first step would be to create 3D models of the data acquisition chassis 11 and the rugged tablet PC 10. It can be appreciated that the methods to create models, merge them together, and modify elements within a 3D CAD system are well known in the art and the novelty contained within a method to create the geometry of a combined assembly comes from considering the ergonomics, ruggedness, form, fit, and function of the combined device. When taking these elements into consideration the resulting method of combining assemblies i.e. selection of orienting planes, yields a unique design among an infinite number of possibilities for combining data acquisition chassis 11 and the rugged tablet PC 10. In FIG. 5 the alignment plane 50 is normal to the printed page along the dotted axis and concurrent to both the top surface of the data acquisition chassis 11 and concurrent to the front surface of the rugged tablet PC 10.

Figure 6:
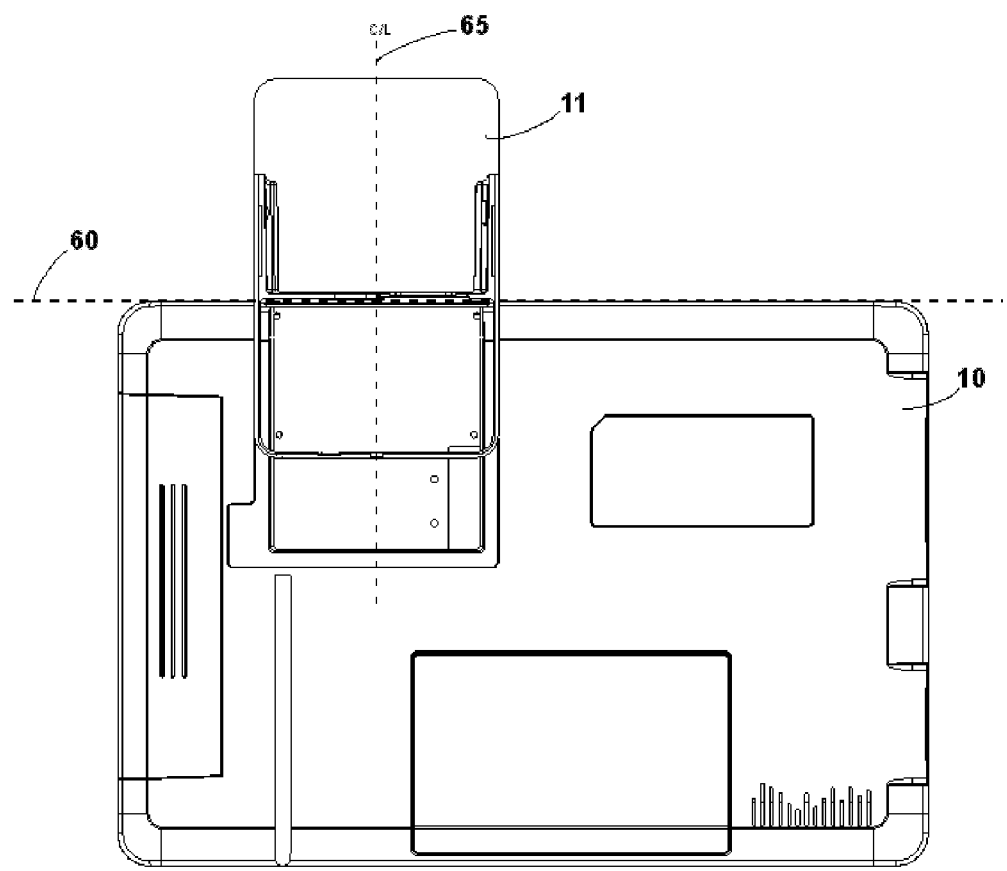
FIG. 6 illustrates a back view of the rugged tablet PC with a superimposed data acquisition chassis to establish the geometry for the chassis.

FIG. 6 further illustrates the ergonomic alignment from the back view of rugged tablet PC 10 and a cut away view of the data acquisition chassis 11 according to the preferred embodiment of the invention. Alignment plane 60 is normal to the printed page along the dotted axis and concurrent to both the rear surface of the wall of the middle housing section that separates the data acquisition chassis 11 into two chambers and concurrent to the top surface of the rugged tablet PC 10. Alignment plane 65 is normal to the printed page along the dotted axis and concurrent to both the normal plane to the top surface of the top housing section along the major axis that bisects the data acquisition chassis 11 into two halves and concurrent to normal plane to the expansion bay 31 pocket surface that bisects the expansion bay 31 into two equal halves. By aligning the corresponding planes on the model of the data acquisition chassis 11 and the rugged tablet 10 the relationship is defined to create an assembly of the two. From this new alignment the data acquisition chassis 11 components can be modified.

Figure 7:
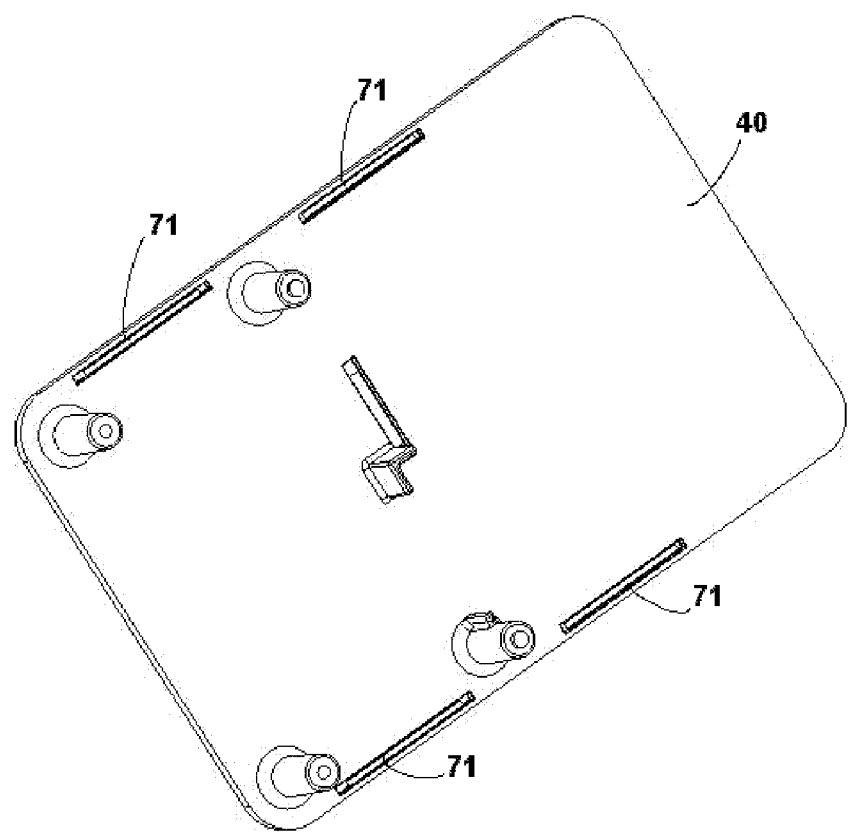
FIG. 7 illustrates a perspective view of the top housing of the data acquisition chassis of FIG. 4.
Figure 9A:
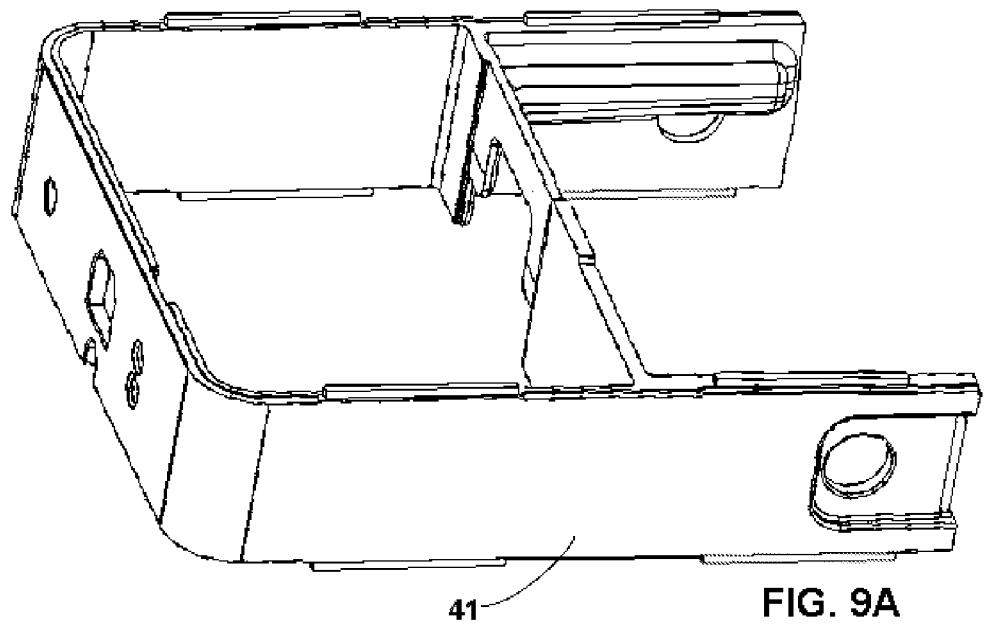
Figure 9B:
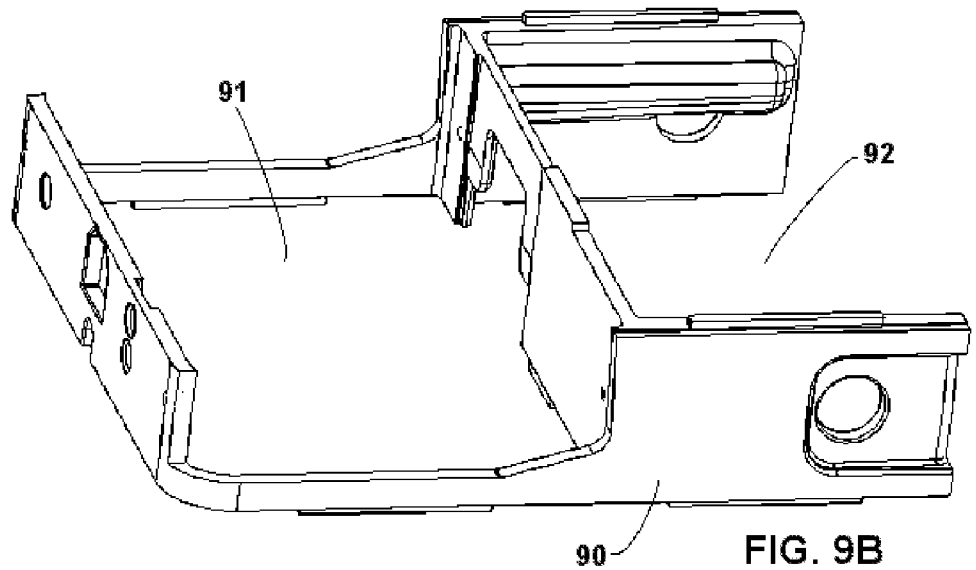
FIG. 9B illustrates a perspective view of the middle housing of the data acquisition chassis according to the present invention.
Figure 10A:
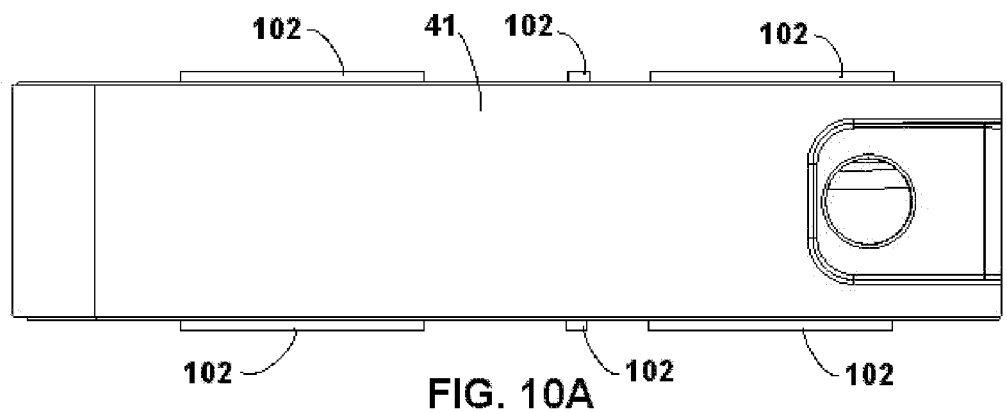
Figure 10B:
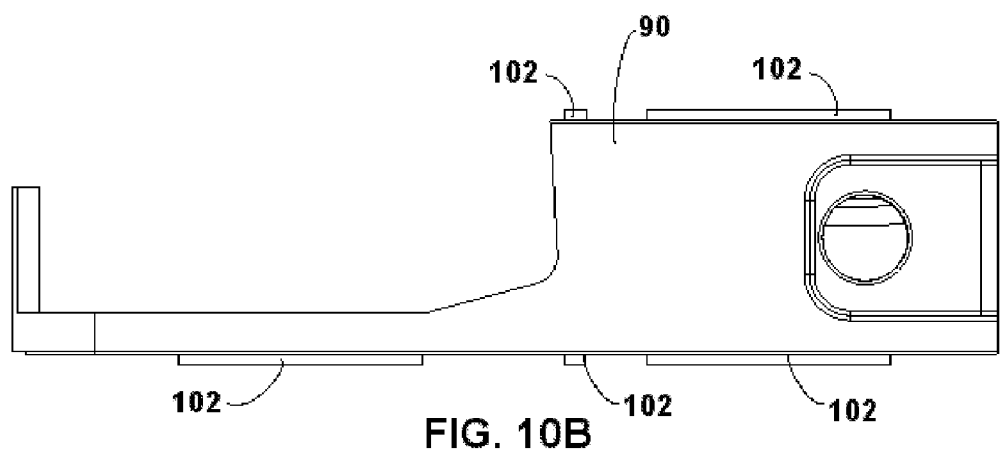
FIG. 10B illustrates a side view of the middle housing of the data acquisition chassis according to the present invention.

FIGS. 7-11 illustrate the chassis housing sections as they exist in the original data acquisition chassis 11 and new modified chassis housing sections according to the preferred embodiment of the invention. FIG. 7 illustrates the bottom view of top section 40 of the original data acquisition chassis housing 11 showing alignment slots 71 used for assembly with the tabs 102 on Middle section 41. FIG. 8A shows the top view of top section 40 of the original data acquisition chassis housing 11 and FIG. 8B shows the side view of top section 40 of the original data acquisition chassis housing 11. FIG. 9A shows a perspective view of middle section 41 of the original data acquisition chassis housing 11 and FIG. 10A shows the side view of middle section 41 of the original data acquisition chassis housing 11. FIG. 11A shows the top view of bottom section 43 of the original data acquisition chassis housing 11 and FIG. 11B shows the side view of bottom section 43 of the original data acquisition chassis housing 11. Once the models are aligned using the planes defined in FIGS. 5 and 6, The housing sections are trimmed at the intersection of the data acquisition chassis 11 and the rugged tablet PC 10 resulting in new housing sections according to the preferred embodiment of the invention. FIG. 8C shows the top view of the new trimmed top section 80 of the data acquisition chassis housing 11 and FIG. 8D shows the side view of new trimmed top section 80 of the data acquisition chassis housing 11. FIG. 9B shows a perspective view of the new trimmed middle section 90 of the data acquisition chassis housing 11 and FIG. 10B shows the side view of the new trimmed middle section 90 of the data acquisition chassis housing 11. FIG. 9B also illustrates the two chambers formed by middle section 90 rear chamber 91 and front chamber 92. The bottom section 43 does not intersect with the rugged tablet housing 10, however to reduce overall weight of the data acquisition chassis 11, the length of the bottom section 43 is shortened from its front edge as illustrated in FIG. 11. The length of the top section 80 is also reduced by an equal amount from its front edge to reduce overall weight. FIG. 11C shows the top view of the new trimmed bottom section 110 of the data acquisition chassis housing 11 and FIG. 11D shows the side view of the new trimmed bottom section 110 of the original data acquisition chassis housing 11. Once the 3D CAD models of the new housing sections are complete, CAM (Computer Aided Manufacturing) software can be used to create CNC software for a milling machine to modify the original housing sections into new housing sections. It should be noted that these new parts can be machined from the old parts, can be injection molded using plastics, cast metals or use any other methodology to produce housing sections.

FIGS. 12A, 12B, 12C, and 12D illustrate the bottom up assembly of data acquisition chassis 11. FIG. 12A illustrates a top view of bottom section 110 with four integral standoffs 47. FIG. 12B shows the addition of interface printed circuit board assembly 42 where holes in integral standoffs 47, align with holes in interface printed circuit board assembly 42. FIG. 12C adds the middle section 90 to the assembly where bottom section 110 has alignment slots 71 to position and confine middle section 90. In FIG. 12D the top section 80 is fastened to middle section 90 using alignment slots 71 on bottom side of top section.

Figure 13A:
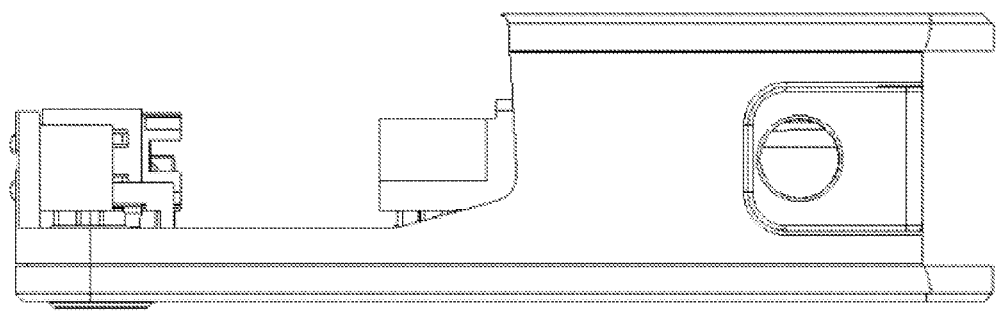
FIG. 13A illustrates a side view of the data acquisition chassis according to the present invention and FIG. 13B illustrates a perspective view of the data acquisition chassis according to the present invention.
Figure 13B:
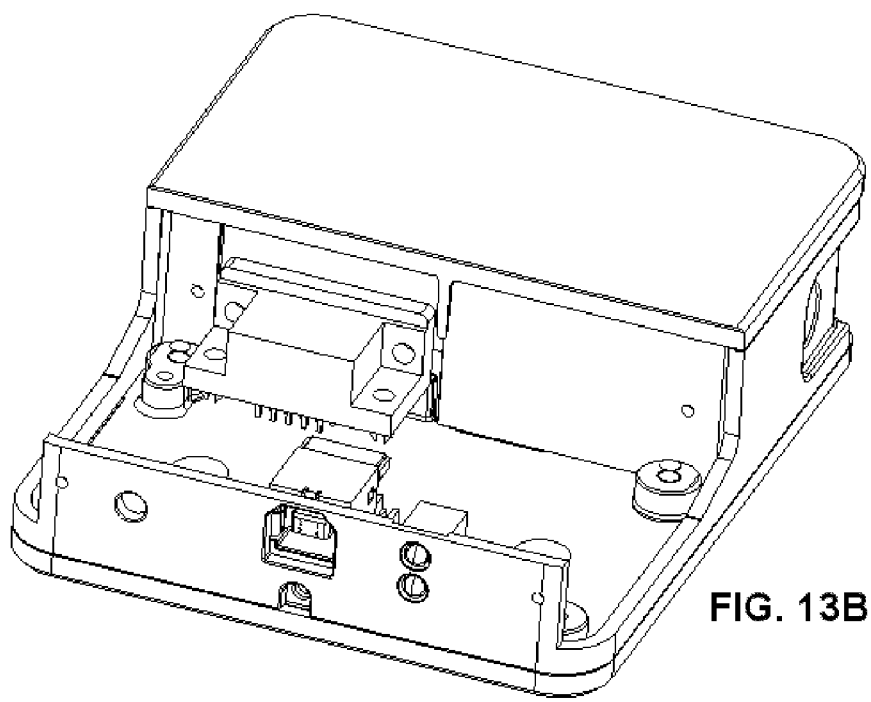

FIGS. 13A and 13B illustrate the new assembled data acquisition chassis 11.

Figure 14A:
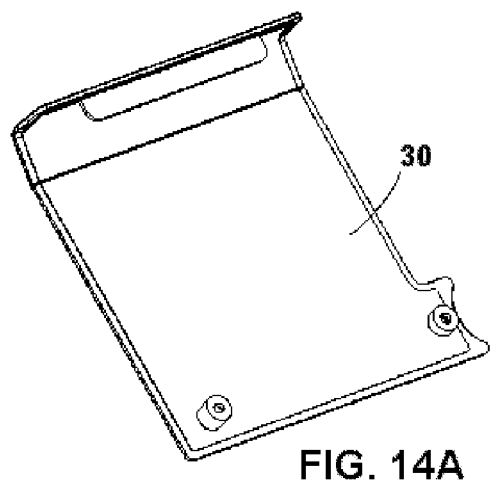
FIGS. 14A, 14B, and 14C illustrate perspective views of the transformation from accessory cover to gasketed interface plate(s) according to the present invention.
Figure 14B:
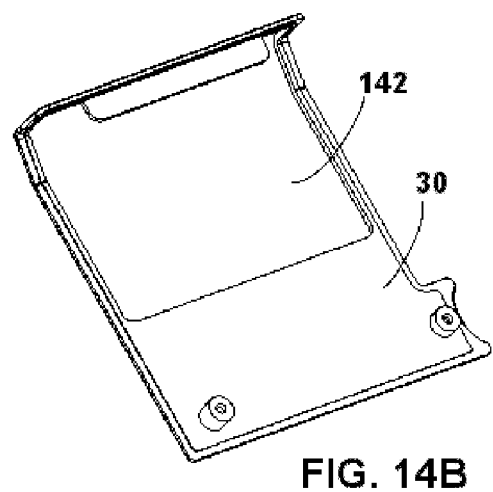
Figure 14C:
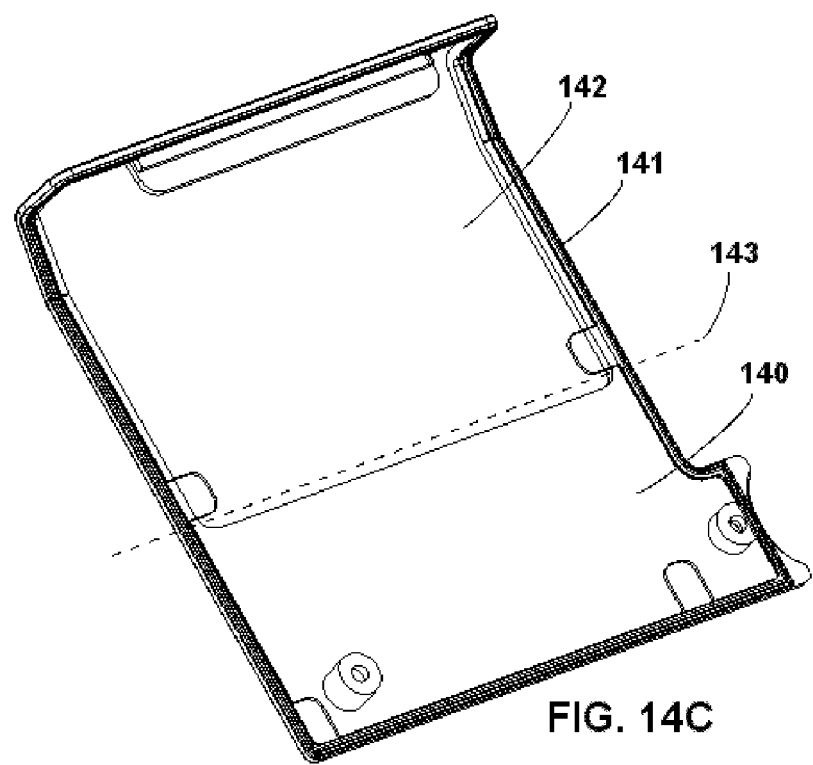

FIGS. 14A, 14B, 14C, and 15 illustrate a way to produce an interface plate 140 from expansion bay cover 30. FIG. 14A shows a bottom view of expansion bay cover 30. When the expansion bay cover 30 is aligned with data acquisition chassis 11 as illustrated in FIG. 6, a clearance hole 142 to access the rear chamber 91 within middle section 90 is made through expansion bay cover 30 as illustrated in FIG. 14B. FIG. 14C shows the addition of gasket 141 to prevent fluid ingression. The gasket 141 may be molded by double shot mold, may be a separate gasket held in place with a groove feature or may be a hardening or non-hardening form a gasket. The dotted line 143 is an optional parting line to separate the interface plate 140 into 2 pieces to enable access to electrical connections of the rugged tablet PC 10 and data acquisition chassis 11. It can be appreciated that the interface plate 140 can be produced without modifying an expansion bay cover 30 and can be produced solely from the profile of the data acquisition chassis 11. The interface plate can be molded from plastic, cast from metal, formed from metal, machined from metal, machined from plastic or created with any appropriate material using any well-known process.

Figure 15:
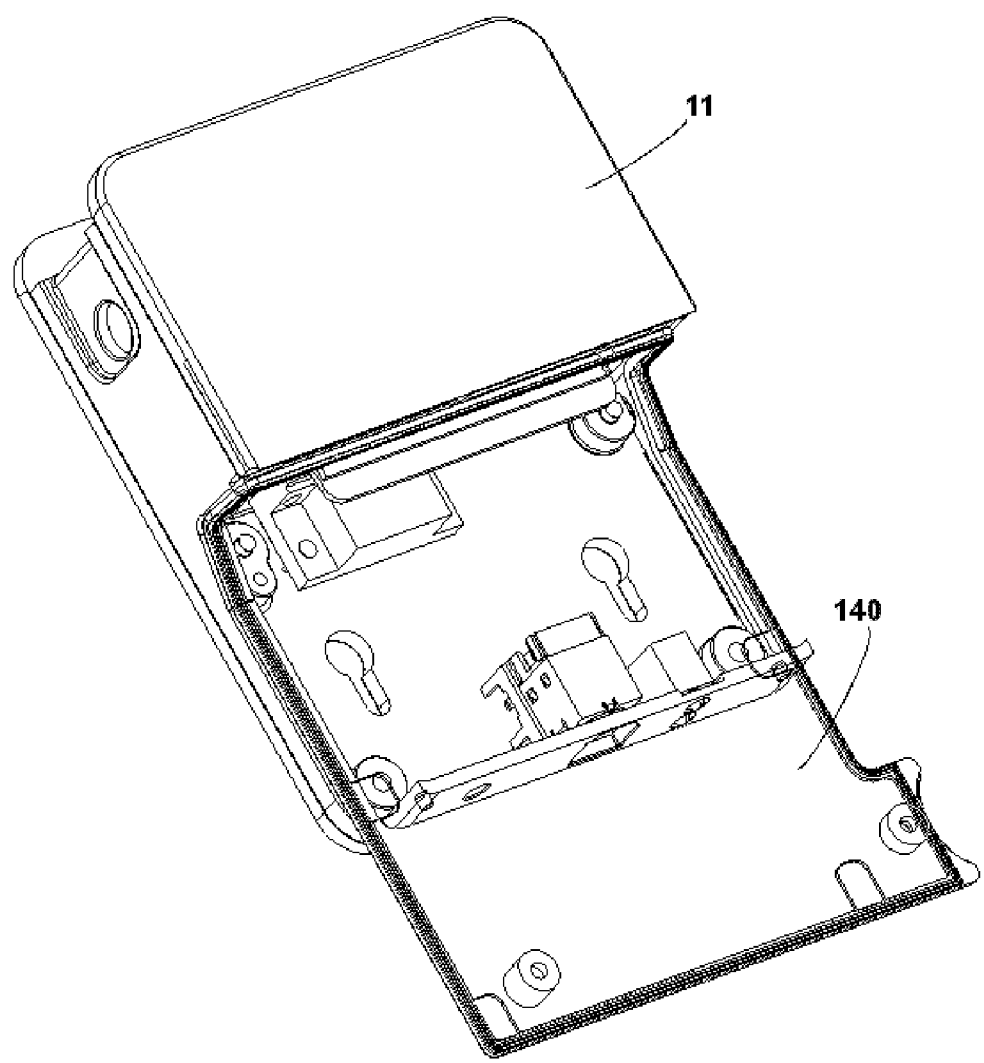
FIG. 15 illustrates a perspective view of the data acquisition chassis combined with the gasketed interface plate according to the present invention.

FIG. 15 shows the interface plate aligned with the data acquisition chassis 11 according to a preferred embodiment of the invention.

Figure 16A:
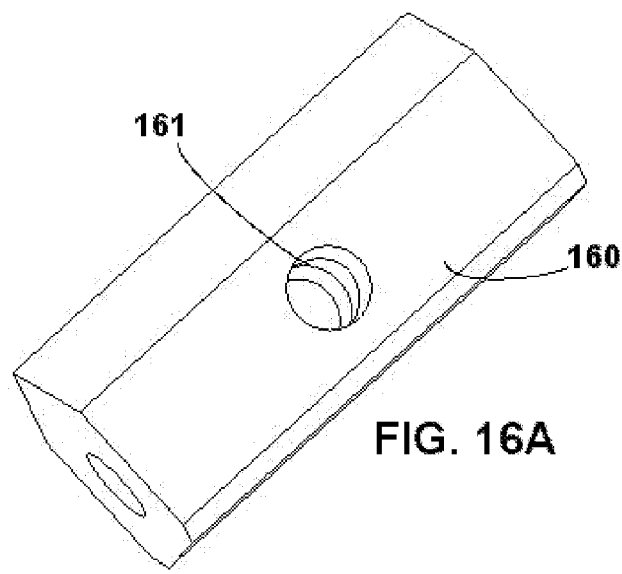
FIGS. 16A and 16B illustrate perspective views of a standoff and a location of standoffs within the accessory pocket of the rugged tablet PC according to the present invention.
Figure 16B:
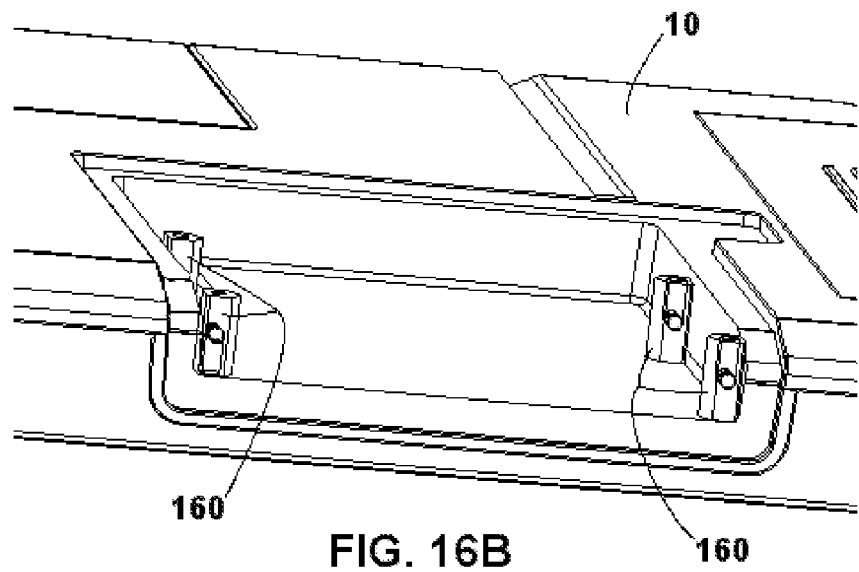

FIG. 16 illustrates the addition of multi-threaded standoffs 160. It can be seen from FIG. 8 that threaded standoffs 44 were removed when top section 40 when it became new top section 80. With the removal of threaded standoffs 44 there is a need to fasten the data acquisition chassis 11 directly to the rugged tablet PC 10. When the data acquisition chassis 11 is assembled to rugged tablet PC 10 the four fasteners that held the data acquisition chassis 11 together are now replaced by four multi-threaded standoffs 160 that fasten independently to bottom section 110, middle section 90 and rugged tablet PC 10 on the expansion bay 31 surface. The multi-threaded standoffs 160 are designed from longer hexagonal standoffs models that are placed in the rugged modular data acquisition tablet computer 15 assembly in axial alignment with holes in interface printed circuit board assembly 42 and then trimmed by the bottom surface of interface printed circuit board assembly 42 and the geometry of rugged tablet PC 10. Once trimmed threaded hole 161 is added on the face of each of four multi-threaded standoffs 160 parallel to the front and back of the data acquisition chassis 11. The alignment of the four multi-threaded standoffs 160 with the expansion bay 31 surface of rugged tablet PC 11 are shown in FIG. 16B. Holes on axis with each of the multi-threaded standoffs 160 are drilled into the expansion bay 31 surface of rugged tablet PC 10 and then countersunk from the bottom surface of the expansion bay 31 of rugged tablet PC 11. Fasteners attached the four multi-threaded standoffs 160 to the expansion bay 31 surface of rugged tablet PC 10.

Figure 17A:
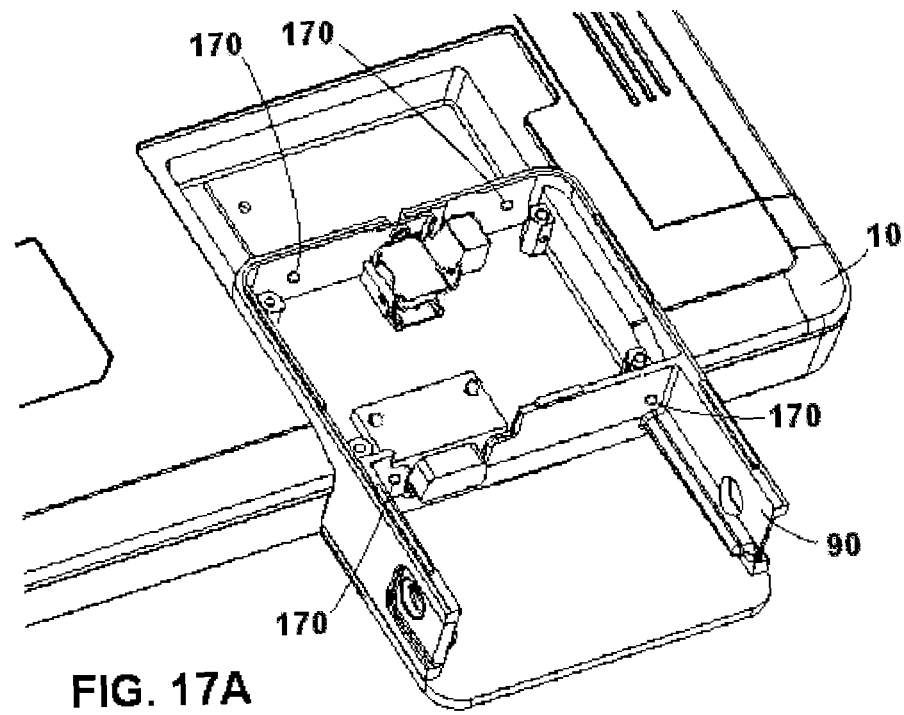
FIGS. 17A and 17B illustrate perspective views of the assembly of a data acquisition chassis within the accessory pocket of the rugged tablet PC according to the present invention.
Figure 17B:
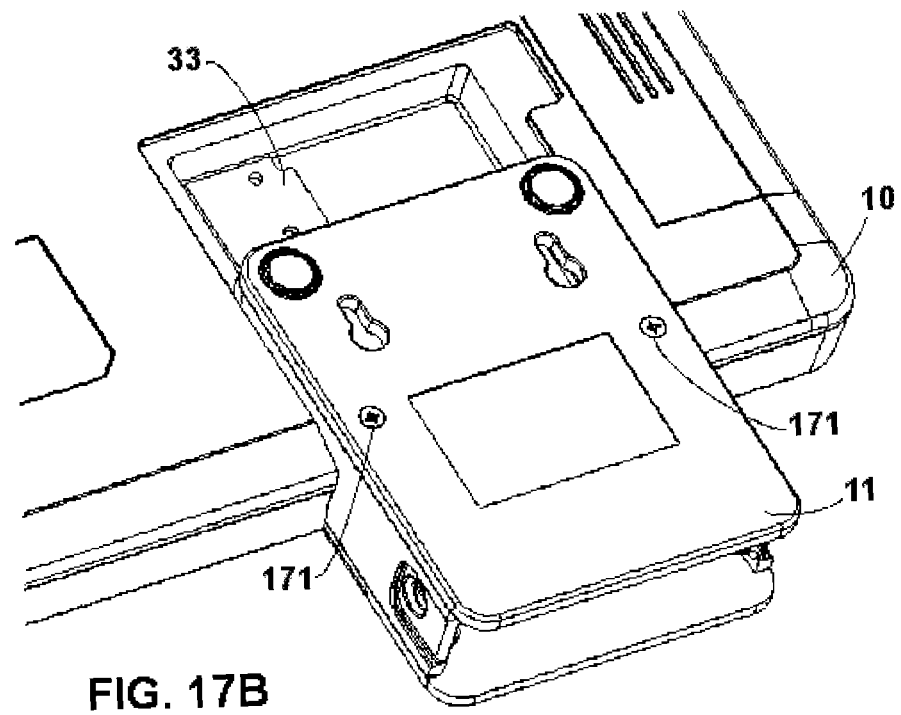

In FIG. 17A threaded holes 170 are placed on middle section 90 where the location of the holes are on axis with threaded holes 161 on multi-threaded standoffs 160. Fasteners are placed between middle section 90 and four multi-threaded standoffs 160. FIG. 17B the back section 110 of the chassis housing is placed on to the assembly and fasteners 171 attach back section 110 to the four multi-threaded standoffs 160. An I/O electrical connection is made between data acquisition chassis 11 and electrical interface connector 33 and then the second half of the gasketed interface plate covers the top half of the expansion bay 31. To summarize the steps to modify all the components and assemble a rugged modular data acquisition tablet computer 15. Disassemble data acquisition chassis 11. Machine top section 80 of chassis housing and middle section 90 of chassis housing on CNC mill according to CNC programs. Machine multi-threaded standoffs 160 to the appropriate geometry. Remove back housing and all back housing covers from rugged tablet PC 10. Machine gasketed interface plate 140 from expansion bay cover 30. Remove molded standoffs from expansion bay 31 if they exist. Drill new holes in expansion bay 31 to align with existing screw holes in data acquisition chassis 11. From underside of expansion bay 31 housing, countersink said new holes in expansion bay 31. Attach the multi-threaded standoffs 160 to middle section 90 of chassis housing using fasteners. Align gasketed interface plate 140 between the middle section 90 of chassis housing with multi-threaded standoffs 160 to topside of the expansion bay 31. Fasten middle section 90 of chassis housing with multi-threaded standoffs 160 to topside of the expansion bay 31 with fasteners from the underside of the expansion bay 31. Reassemble the back housing of the rugged tablet PC 10. Attach interface printed circuit board 42 to the bottom section 110 of chassis housing. Align bottom section 110 of chassis housing to middle section 90 of chassis housing and fasten it to the multi-threaded standoffs 160. Attach I/O connection between tablet motherboard and data acquisition chassis. Align top section 80 of chassis housing to middle section 90 of chassis housing and fasten it. Fasten remaining gasketed interface plate 140 to the back of the rugged tablet PC 10. Assembly complete.

Figure 18A:
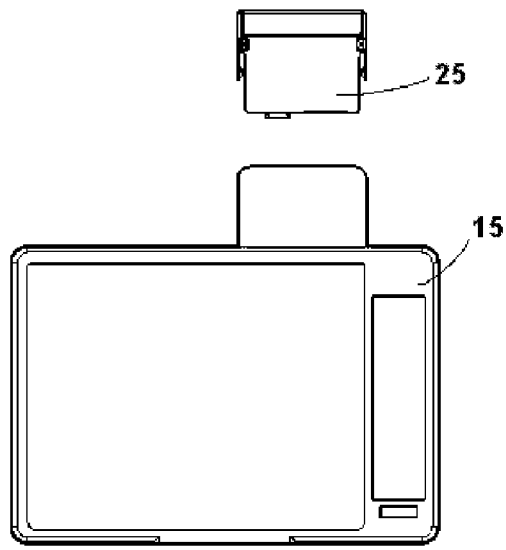
FIGS. 18A, 18B, and 18C illustrate perspective views of a rugged tablet PC with attached data acquisition chassis and a data acquisition module being inserted for use.
Figure 18B:
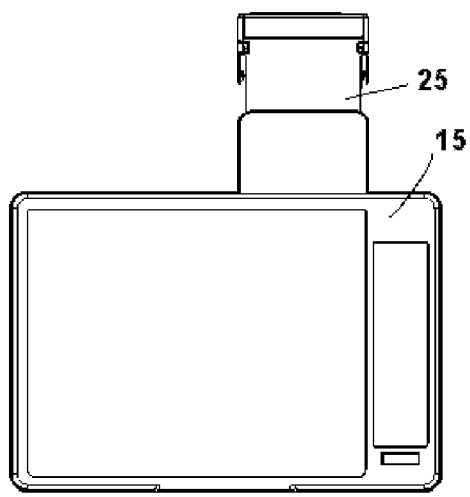
Figure 18C:
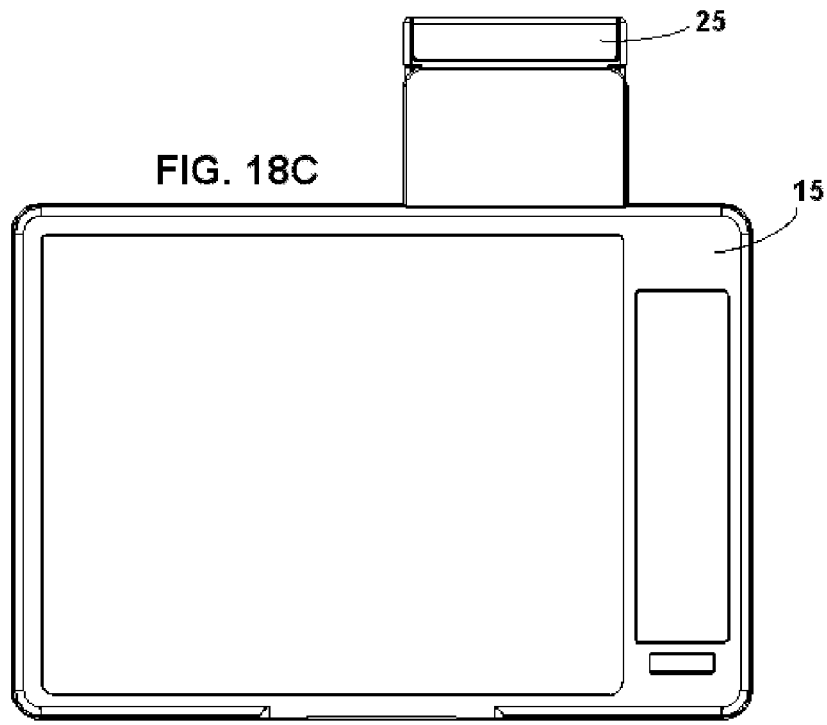

FIG. 18A, 18B, 18C illustrates how data acquisition module 25 gets inserted into the data acquisition chassis 11 that is part of a rugged modular data acquisition tablet computer 15.

The applicant has provided a method and apparatus, with several options, for creating a rugged modular data acquisition tablet computer 15. Although the apparatus and methods taught herein are the preferred and alternate embodiments, it can be recognized that other form factors, materials, and methods of achieving the same results can be contrived from the disclosed teachings.

What is claimed is:

1. An apparatus comprising a rugged modular data acquisition tablet computer including:
   a rugged tablet PC with fluid ingress resistant housing;
   said rugged tablet PC comprising a central processing unit (CPU), memory, power supply, system bus, data storage, peripheral interface ports, loudspeaker and touch screen;
   a data acquisition chassis with at least one slot to accept at least one data acquisition module;
   said data acquisition chassis comprising a housing including a top section, a middle section and a bottom section that when assembled separate said data acquisition chassis into two chambers
   said data acquisition chassis including a front chamber having an integral geometry and at least one electrical connector to accept at least one data acquisition module, and
   a rear chamber for housing interface circuitry to configure and communicate data from at least one said data acquisition module to said rugged tablet PC;
   said middle section having a top edge and a bottom edge, said bottom edge contoured to mate with said bottom section to encase said front chamber and said rear chamber,
   said middle section further contoured on said top edge to mate with said top section to encase said front chamber,
   said top edge of said middle section further contoured to follow the surface geometry of said rugged tablet PC to encase said rear chamber; and
   an interface plate having a gasket to seal said data acquisition chassis to said rugged tablet PC, wherein
   said interface plate is compressed between said surface geometry and the said contour of said top edge of said middle section, thereby encasing said rear chamber between said rugged tablet PC and said data acquisition chassis when said rugged tablet PC is fastened to said data acquisition chassis.

2. Apparatus according to claim 1, wherein said top section, said middle section and said bottom section are metal castings.

3. Apparatus according to claim 1, wherein said top section, said middle section and said bottom section are molded with a plastic material.

4. Apparatus according to claim 1, wherein said touch screen display comprises a projected capacitive multi-touch interface.

5. Apparatus according to claim 1, wherein said data acquisition module further comprises a sensor that responds to a physical stimulus selected from a group of physical stimuli including heat, light, sound, pressure, magnetism, and a particular motion and wherein said sensor responds with a signal conveyed to the said data acquisition module.

6. Apparatus according to claim 5, wherein said data acquisition module receives electrical power from said rugged tablet PC and provides power to said sensor.

7. Apparatus according to claim 1, wherein said gasket is molded on to said interface plate.

8. Apparatus according to claim 1, wherein said interface plate is selected from a group of material forming processes including cast metal, formed metal, molded plastic, machined metal, and machined plastic.

9. Apparatus according to claim 1, wherein said fluid ingress resistant housing is comprised of a top housing and a bottom housing wherein said top housing and said bottom housing mate together and wherein at least one of said top housing and said bottom housing has an integral molded gasket to make a fluid ingress resistant seal between said top housing and said bottom housing.

10. Apparatus according to claim 1, wherein said rugged modular data acquisition tablet computer further comprises standoffs and fasteners to mechanically couple said data acquisition chassis to said rugged tablet PC.

11. Apparatus according to claim 9, wherein each of said standoffs couple to said middle section of said data acquisition chassis, said bottom section of said data acquisition chassis, said bottom housing of said rugged tablet PC using said fasteners.

12. Apparatus according to claim 1, wherein said data acquisition module contains a standardized electrical interface and form factor to create unique data acquisition modules.

13. Apparatus according to claim 1, wherein said top section and said bottom section are shortened in overall length from the front surface of both sections to reduce overall weight of the assembly wherein said middle section remains fully encased between said shortened top section and said shortened bottom section.

14. A method of creating chassis geometry comprising:
creation of a 3D model of a rugged tablet PC comprising tablet computer housings and an expansion bay cover when said rugged tablet PC is equipped with an expansion bay;
creation of a 3D model of a data acquisition chassis comprising a housing having a top housing section, a middle housing section, and a bottom housing section;
Creation of three perpendicular alignment planes on said 3D rugged tablet PC model corresponding to a plane one being a front surface of said rugged tablet PC, a plane two being a top surface of said rugged tablet PC and a plane three being a normal plane to a surface of said expansion bay that bisects said expansion bay into two equal halves absent said expansion bay, a plane three being normal to a back surface of said rugged tablet PC where there would be no interference with existing I/O elements;
Creation of three perpendicular alignment planes on said data acquisition chassis model corresponding to a plane one being a top surface of said top housing section, a plane two being parallel to a rear surface of a wall of the middle housing section that separates the data acquisition chassis into two chambers and a plane three being a normal plane to a top surface of said top housing section along a major axis that bisects said data acquisition chassis into two halves;
Align said plane one of said rugged tablet PC with said plane one of said data acquisition chassis;
Align said plane two of said rugged tablet PC with said plane two of said data acquisition chassis;
Align said plane three of said rugged tablet PC with said plane three of said data acquisition chassis;
Create an intersection between said surface geometry of said rugged tablet PC, and said surface geometry of said data acquisition chassis model;
Trim all material from said top housing section of said data acquisition chassis and said middle housing section of said data acquisition chassis that is contained within said intersection of said rugged tablet PC model;
Create a CAM CNC program to machine material to be removed from said top housing section of said data acquisition chassis; and
Create a CAM CNC program to machine material to be removed from said middle housing section of said data acquisition chassis.

15. The method according to claim 14, wherein there is creation of a threaded hexagonal standoff model;
creation of an interface printed circuit board model; wherein
said interface printed circuit board model includes holes that are aligned with said bottom housing section of said data acquisition chassis, and wherein said holes in said interface printed circuit board model align on an axis with holes in said integral printed circuit board standoff on said bottom housing section of said data acquisition chassis and are mated together;
four, said threaded standoffs are aligned on an axis with each of four holes in said interface printed circuit board model and mated together forming an assembly with said rugged tablet PC, said data acquisition chassis, said interface printed circuit board, and said four threaded standoffs;
each of said four threaded are trimmed at the intersection (s) with the rugged tablet PC;
the resulting threaded standoffs are bisected in length to place threaded holes at a center on a face parallel to the front or back of said data acquisition chassis.

16. The method according to claim 15, wherein said threaded holes are created in said middle housing section of said data acquisition chassis, and said threaded holes are located on said rear face and said front face of said rear cavity of said middle housing section so as to align on an axis with said threaded holes of said threaded standoffs that are parallel to said front and said back of said data acquisition chassis.

17. The method according to claim 14, wherein there is a further creation of an interface plate model wherein said top surface of said middle housing section of said data acquisition chassis is intersected with said rugged tablet PC to form a perimeter of said interface plate;
wherein said Interface plate is extruded from said perimeter;
features for gasket are incorporated herein.

18. The method according to claim 14, wherein an expansion bay cover model comprises a molded-in gasket and said interface plate model is defined as said expansion bay cover with an opening through the front face wherein said opening is defined by said perimeter of said top surface of said middle housing section intersecting with said expansion bay cover when assembled.

19. The method according to claim 17, wherein said interface plate model comprises two pieces to allow access to electrical connections on the said back of said data acquisition chassis.

20. A method of manufacturing a rugged tablet PC based modular data acquisition system:
Disassemble a data acquisition chassis, said data acquisition chassis having a housing;
Machine a top section of said housing of said data acquisition chassis and a middle section of said housing of said data acquisition chassis on CNC mill according to CNC programs;
Machine multi-threaded standoffs having a predetermined geometry;
Remove a back housing and back housing covers from said rugged tablet PC;
Machine a two-piece gasketed interface plate from an expansion bay cover;
Remove molded-in standoffs from expansion bay when they exist;
Drill holes in said expansion bay to align with existing screw holes in said data acquisition chassis;
From an underside of said expansion bay housing, countersink said holes in said expansion bay;
Attach said multi-threaded standoffs to said middle section of said housing of said data acquisition chassis using fasteners;
Align one piece of said gasketed interface plate between a middle housing section of said data acquisition chassis housing with said multi-threaded standoffs to topside of said expansion bay;
Fasten said middle section of said housing of said data acquisition chassis with said multi-threaded standoffs to said topside of said expansion bay with fasteners from said underside of the expansion bay;

Reassemble said back housing of said rugged tablet PC;

Attach an interface printed circuit board to said housing of said bottom section of data acquisition chassis;

Align said bottom section of said housing of said data acquisition chassis to said middle section of said housing of said data acquisition chassis and fasten to said multi-threaded standoffs;

Wherein said rugged tablet PC includes a motherboard, and wherein an I/O connection is attached between said motherboard and said data acquisition chassis;

Align a top section of said housing of said data acquisition chassis to a middle section of said housing of said data acquisition chassis and fasten it;

Fasten second half of said gasketed interface plate to the back of said rugged tablet PC.

* * * * *